United States Patent [19]

Hansen

[11] Patent Number: 4,493,187

[45] Date of Patent: Jan. 15, 1985

[54] FUEL CONTROL

[75] Inventor: Kenneth P. Hansen, Enfield, Conn.

[73] Assignee: United Technologies Corporation, Hartford, Conn.

[21] Appl. No.: 453,201

[22] Filed: Dec. 27, 1982

[51] Int. Cl.³ .............................................. F02C 9/26
[52] U.S. Cl. .............................................. 60/39.281
[58] Field of Search ............................ 60/39.281, 734

[56] References Cited

U.S. PATENT DOCUMENTS

| | | | |
|---|---|---|---|
| 3,672,163 | 6/1972 | White | 60/39.281 |
| 3,991,569 | 11/1976 | Smith | 60/39.281 |
| 4,302,931 | 12/1981 | White et al. | 60/39.281 |

Primary Examiner—Louis J. Casaregola
Attorney, Agent, or Firm—John Swiatocha

[57] ABSTRACT

Fuel flow to the burner (10) of a gas turbine engine (15) is turned on and off by a minimum pressure valve (60) controlled by a fluid pressure operated sequence valve (110). The sequence valve includes a valve element (125) set by the pressurization thereof with fuel discharged from a pump (35). The setting of the sequence valve element (125) is maintained by a fluid latch also energized by fuel discharged from the pump whereby no complex linkages or electric motors are required for the setting of the sequence valve and the maintenance of such setting.

5 Claims, 1 Drawing Figure

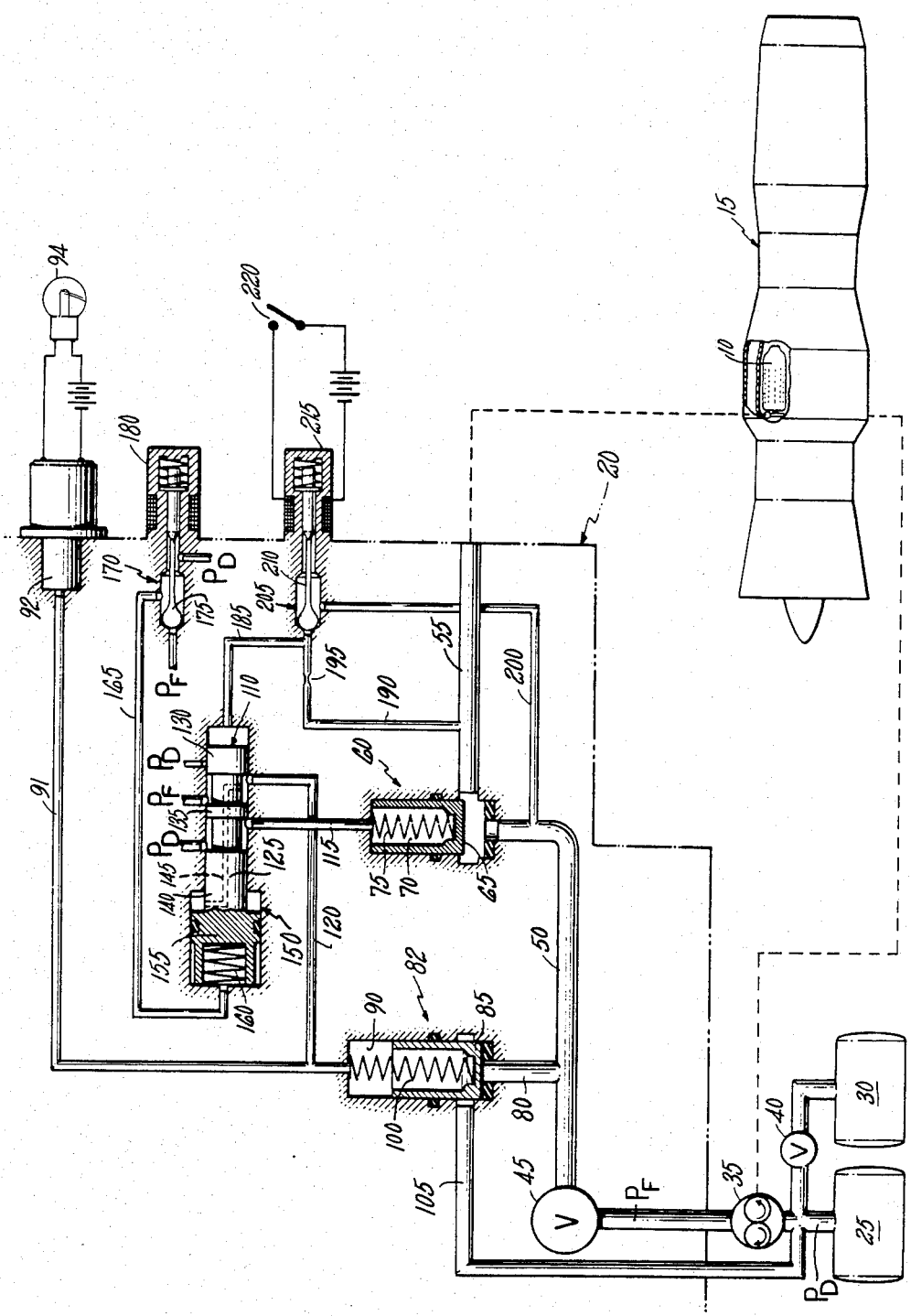

FUEL CONTROL

CROSS REFERENCE

This invention relates to U.S. patent application Ser. No. 277,492 filed June 26, 1981 and entitled AUTOMATIC VENT FOR FUEL CONTROL.

TECHNICAL FIELD

This invention relates generally to hydromechanical fuel controls for gas turbine engines and particularly to an improvement in the means for turning fuel flow to the burner of the gas turbine engine on and off.

BACKGROUND ART

Typically, hydromechanical fuel controls for gas turbine engines include a minimum pressure and shutoff valve ("minimum pressure valve") which turns fuel flow to the burner of the gas turbine engine on and off. In operation, when the engine is turned over by the starter in preparation for starting, the engine's fuel pump is activated and fuel is pumped to the control. The minimum pressure valve remains closed until the pump output pressure is sufficient to operate the fuel control. A typical gas turbine engine fuel control also includes a windmill bypass valve ("bypass valve") which accommodates fuel flow back to the fuel tanks from the pump outlet as the engine is turned over, prior to starting. Thus, as the engine turns over and the minimum pressure valve is closed, the bypass valve remains open to provide a return for the pump discharge. When the engine is started and the minimum pressure valve is opened, the bypass valve closes to provide the desired fuel pump output to the engine burners.

It will be appreciated from the foregoing that means are necessary to control the opening and closing of the minimum pressure and bypass valves. It has been the practice to fluid mechanically actuate these valves by a sequence valve which selectively pressurizes the valves to achieve the operating characteristics thereof noted hereinabove. It has also been the practice to actuate the sequence valve either electrically or mechanically from the cockpit of the aircraft in which the gas turbine engine is utilized. In one known arrangement, a mechanical linkage connects the sequence valve to a manually operable lever in the cockpit. Alternatively, the sequence valve may be actuated and held in position by an electric motor connected thereto by a linkage. Such arrangements have in the past proven to be rather complex. Installation of the actuating motors and/or linkage therefor has proven to be quite time consuming, involving substantial manual rigging and adjustment. Moreover, such arrangements tend to contribute significantly to the cost of the fuel control, yet do little in terms of enhancing the reliability of the system.

DISCLOSURE OF INVENTION

It is therefore a principal object of the present invention to provide an improved arrangement for controlling the start-up and shutdown of fuel flow to a gas turbine engine burner.

It is another object of the present invention to provide such an arrangement characterized by enhanced reliability.

It is another object of the present invention to provide such an arrangement characterized by an economy of construction and ease in assembly.

These and other objects which will become more readily apparent from the following detailed description taken in connection with the appended claims and accompanying drawing, are attained by the present invention wherein a sequence valve controlling a minimum pressure valve is provided with a fluid latch. The latch maintains the setting of the sequence valve which allows the minimum pressure valve to open, thereby passing fuel flow to the engine. The latch is actuated by the pressurization of the sequence valve element with pump discharge pressure delivered thereto from upstream of the shutoff valve through a solenoid operated start valve whereby actuation of the sequence valve is achieved despite the minimum pressure valve being closed as pump discharge pressure is brought up to the requisite value when the engine is cranked. In the preferred embodiment, the latch comprises a piston connected to a movable valve element, pressurization of the piston and therefore maintenance of latch position being effected by the discharge from the fuel pump. A solenoid operated shutoff valve, when actuated, applies pump discharge pressure to the fluid latch for unlatching the sequence valve element to cause a closing of the minimum pressure valve when it is desired to terminate fuel flow to the engine. The sequence valve operates the bypass valve in the above-noted synchronization with the minimum pressure valve.

BRIEF DESCRIPTION OF DRAWING

The sole figure is a partial schematic illustration of a gas turbine engine fuel control illustrating in detail, the invention herein.

BEST MODE AND CARRYING OUT THE INVENTION AND INDUSTRIAL APPLICABILITY

Referring to the drawing, fuel flow to the burner 10 of a gas turbine engine 15 is controlled by a hydromechanical fuel control represented generally by the apparatus partially enclosed by dotted line 20. For clarity, only a portion of fuel control 20 relevant to the present invention is shown in detail herein. Hydromechanical fuel controls in general are well known in the art, representative fuel controls being the JFC-60 and a JFC-68 fuel controls manufactured by the Hamilton Standard Division of United Technologies Corporation, the assignee of the present invention.

Fuel control 20 is interposed between burner 10 and fuel tanks 25 and 30, fuel pump 35 (powered by the engine spool) drawing fuel sequentially from tanks 25 and 30. Valve 40 is opened upon the draining of tank 25 thereby allowing fuel flow from tank 30 to the pump and preventing the pump from drawing air from empty tank 25.

The main metering valve 45 of fuel control 20 meters the requisite amount of fuel from the discharge of pump 35 through lines 50 and 55 to the burner on the basis of various engine operating parameters and demanded thrust. Minimum pressure valve 60 is disposed at the juncture of lines 50 and 55 and turns on and off the flow of fuel from metering valve 45 to the engine. Minimum pressure valve 60 comprises a valve element 65 having a chamber 70 therein, the chamber accommodating spring 75 which biases valve element 65 downwardly blocking fuel flow to the engine. Branch line 80 communicating with line 50 includes a windmill bypass valve ("bypass valve") 82 therein, this valve being similar in structure to valve 60. Thus, bypass valve 82 includes a reciprocally movable valve element 85 having a cavity 90 therein which receives a spring 100 biasing valve element 85 downwardly to block fuel flow from metering valve 45 through branch line 80 and line 105 to the inlet to pump 35. The pressure in chamber 90 is fed via line 91 to a pressure switch 92 which operates an indicator light 94 in the aircraft cockpit or other operator's station.

Minimum pressure valve 60 and bypass valve 82 are controlled by a sequence valve 110 connected to the minimum pressure and bypass valves by means of lines 115 and 120, respectively. Sequence valve 110 includes a valve element (spool) 125 provided with lands 130, 135 and 140 and includes an internal passage 145 by which fluid pressure between lands 130 and 135 is provided to that portion of the valve outwardly of land 140. The sequence valve also includes a fluid latch 150 including a piston 155 biased to the right by spring 160. Sequence valve 110 communicates with valve inlets pressurized with fuel at pump discharge pressure ($P_F$) and drain pressure $P_D$ (pump inlet pressure) as illustrated in the general area of pump 35. The surface of latch piston 155 against which spring 160 is seated is selectively pressurized with either drain pressure or pump discharge pressure through line 165 which terminates at shutoff valve 170 comprising a reciprocally movable ball element 175 operated by solenoid 180. The right end of sequence valve element 125 is selectively pressurized with fuel through line 185 which joins line 190 having restriction 195 therein, line 190 itself communicating with line 55. Line 185 is also supplied with fuel through line 200 which communicates with line 50 and start-up valve 205 located at the terminations of lines 190 and 200. Start-up valve 205 includes a reciprocally movable ball valve element 210 operated by an electric solenoid 215. Solenoid 215 is actuated by switch 220.

Operation of the fuel control is as follows: When the fuel pump is not operating, fuel flow to the engine is shut off and springs 75 and 100 bias the valve elements of the minimum pressure and bypass valves 60 and 80, respectively, downwardly. Start-up and shutdown valves 205 and 170, respectively, are in the positions illustrated and spring 160 biases sequence valve element 130 and latch piston 155 of the sequence valve to the right.

When it is desired to start the engine, the spool of engine 10 and fuel pump 35 are first driven (turned over) by such means as an auxiliary turbine. When the pump discharge pressure ($P_F$) reaches the requisite magnitude and it is desired to start the engine, solenoid 215 is actuated by the setting of switch 220. This moves ball valve element 210 of start-up valve 205 to the right, opening a connection between line 185 and line 200. Accordingly, it will be seen that when start-up valve 205 is actuated, the end face of land 130 in sequence valve 110 will be pressurized by pump discharge flow through lines 50, 200, valve 205 and line 185. The pump discharge pressure, having reached the requisite magnitude moves sequence valve element 125 to the left (the position illustrated). It will be seen that until sequence valve element 125 is set in its left-hand position, pump discharge pressure from between lands 135 and 140 is applied to the interior of minimum pressure valve element 65 through line 115, thereby urging that element downwardly with spring 75 to close that valve. In this deactuated position, sequence valve element 125 applies drain pressure from between lands 130 and 135 to the interior of bypass valve element 85 through line 120 whereby pump discharge pressure in line 50 and branch line 80 urges valve element 85 upwardly against the bias of spring 100 opening the bypass valve and allowing the pump discharge to return to the pump inlet through line 105.

As set forth hereinabove, such pump discharge pressure applied to land 130 of sequence valve 110 through line 185, urges valve element 125 to the left, the position illustrated in the drawing. A setting of the sequence valve element in the illustrated position has a number of effects on the fuel control. First, pump discharge pressure applied to the interior of minimum pressure valve element 65 is replaced by drain pressure applied thereto from between lands 135 and 140 allowing pump discharge through line 50 to pressurize and lift valve element 65, opening a passage between lines 50 and 55 to the engine burner. Likewise, drain pressure applied to the interior of bypass valve element 85 is replaced by pump discharge pressure applied thereto from between lands 130 and 135, closing the bypass valve so that all of the pump discharge is available for metering to the burner. The application of pump discharge pressure to the bypass valve is sensed by pressure switch 92 which turns on signal lamp 94 informing the pilot that the sequence valve has been actuated. Furthermore, movement of sequence valve element 125 to the left opens passage 145 to pump discharge pressure, whereby piston 155 is pressurized at the right surface thereof, latching the sequence valve in the illustrated position. Therefore, it will be seen that once valve spool 125 is latched, solenoid 215 may be switched off, interrupting flow around minimum pressure valve 60 and the pump discharge pressure on piston 155 will maintain the illustrated setting of the sequence valve. Those skilled in the art will appreciate that latching spool 125 with fuel pressure in the manner described, enhances the life expectancy and therefore, the reliability of solenoid 215.

Accordingly, it will be seen that the sequence valve effectively controls the minimum pressure valve and bypass valves to start and maintain fuel flow from the pump to the engine burner without the necessity of any linkages, electric motors, or other equipment contributing to the cost and weight of the fuel control while detracting from the reliability thereof and the ease with which the control is integrated into the engine and the aircraft in which it is employed. Unlike prior systems utilizing such linkages and electric motors, the present system merely requires a minimum number of additional lines in the hydromechanical fuel control and a simple solenoid operated ball valve to control the admission of pump discharge pressure to the sequence valve to effect actuation thereof.

When it is desired to shut engine 15 down, solenoid 180 is energized, moving shutoff ball valve 175 to the right thereby opening a passage between pump discharge pressure $P_F$ and line 165. Accordingly, it will be seen that such pressurization applies pump discharge pressure to the left surface of piston 155 as well as the right surface thereof. However, inasmuch as pressurization of the left surface of the piston is cumulative with the bias of spring 160, and since the pressure on land 130 is reduced somewhat from full pump discharge pressure by restriction 195, such pressurization of the piston unlatches the sequence valve element moving that element to the right, reapplying pump discharge pressure to the shutoff valve and drain pressure to the bypass valve thereby shutting off fuel flow to the engine. Normally, the shutoff valve solenoid will remain energized for a short period of time (5 sec.) until pump discharge pressure drops to a value wherein unwanted repressurization of land 130 is obviated.

The deactivation of the sequence valve is indicated by the switching off of indicator lamp 94 in response to drain pressure being reapplied to the bypass valve and line 91. It will be seen that when the sequence valve element is positioned in the off setting (to the right) drain pressure in line 115 and chamber 70 of the minimum pressure valve is also replaced by pump discharge pressure to close the minimum pressure valve.

While the present invention has been described with respect to one embodiment thereof it will be appreciated by those skilled in the art that various modifications may be made without departing from this invention. For example, line 190 may terminate at drain rather than at line 55. In such instance, it may not be necessary to maintain shutoff solenoid 180 energized for any length of time to prevent reactivation of the sequence valve since drain pressure would be applied to land 130 of the sequence valve element once solenoid 215 is deenergized. Accordingly, it is intended by the appended claims to cover this and any other such modifications which may fall within the true spirit and scope of this invention.

Having thus described the invention, what is claimed is:

1. In a fuel control for a gas turbine engine including a burner, fuel being supplied to said burner by a pump through a fluid pressure operated minimum pressure valve opened to allow fuel flow from said pump to said burner and closed to shut off said fuel flow, actuation of said minimum pressure valve being controlled by a sequence valve communicating with said minimum pressure valve by a fluid line, the improvement characterized by:

said sequence valve being connected to pump discharge pressure by a pump discharge line and including a moveable valve element, the position thereof controlling the pressure in said fluid line, thereby determining the actuation of said minimum pressure valve, and further including a fluid latch comprising a piston connected to said valve element and communicating with said pump discharge pressure at said sequence valve through a fluid passage, pressurization of said piston in a first direction by said fuel maintaining said sequence valve element in a latched condition for maintenance of said minimum pressure valve in an opened condition to sustain fuel flow from said pump to said burner.

2. The improvement of claim 1 characterized by a start-up valve connected to pump discharge pressure by said pump discharge line and communicating with said sequence valve element for providing select fluid communication between said sequence valve element and said fuel discharged from said pump.

3. The improvement of claim 2 characterized by said start-up valve being operated by an electric solenoid.

4. The improvement of claim 1 characterized by said sequence valve latch including means biasing said piston in a direction opposite said first direction, said piston being connected to pump discharge pressure by a second pump discharge line having a shutoff valve therein for controlling the application of pump discharge pressure to said piston in said opposite direction, said latch being deactuatable by the cumulative biasing of said piston by said biasing means and pressurization thereof in said opposite direction by pump discharge pressure within said second pump discharge line.

5. The improvement of claim 4 characterized by said shutoff valve being operated by an electric solenoid.

* * * * *